(12) United States Patent
Le et al.

(10) Patent No.: US 7,823,145 B1
(45) Date of Patent: Oct. 26, 2010

(54) UPDATING SOFTWARE ON DORMANT DISKS

(75) Inventors: Bich Cau Le, San Jose, CA (US);
Robert F. Deuel, Menlo Park, CA (US);
Sirish Raghuram, Sunnyvale, CA (US);
Yufeng Zheng, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 1018 days.

(21) Appl. No.: 11/395,431

(22) Filed: Mar. 31, 2006

(51) Int. Cl.
*G06F 9/44* (2006.01)
*G06F 9/45* (2006.01)

(52) U.S. Cl. .................. 717/168; 717/173; 709/203

(58) Field of Classification Search ......... 717/168–174; 709/203–204
See application file for complete search history.

(56) References Cited

U.S. PATENT DOCUMENTS

| | | | |
|---|---|---|---|
| 5,684,996 A * | 11/1997 | Westerholm et al. ........ 717/168 |
| 5,974,454 A * | 10/1999 | Apfel et al. .................. 709/221 |
| 6,289,397 B1 | 9/2001 | Tsuyuguchi et al. |
| 6,353,926 B1 * | 3/2002 | Parthesarathy et al. ...... 717/170 |
| 6,874,143 B1 * | 3/2005 | Murray et al. ............... 717/173 |
| 6,915,513 B2 * | 7/2005 | Duesterwald et al. ........ 717/168 |
| 6,996,817 B2 * | 2/2006 | Birum et al. ................. 717/170 |
| 7,003,767 B2 * | 2/2006 | Larkin ......................... 717/172 |
| 7,051,327 B1 * | 5/2006 | Milius et al. ................. 717/177 |
| 7,155,462 B1 * | 12/2006 | Singh et al. .................. 717/170 |
| 7,155,710 B2 * | 12/2006 | Breckner et al. ............. 717/168 |
| 7,165,158 B1 | 1/2007 | Yagawa |
| 7,216,343 B2 * | 5/2007 | Das et al. ..................... 717/168 |
| 7,281,245 B2 * | 10/2007 | Reynar et al. ................ 717/173 |
| 7,356,679 B1 * | 4/2008 | Le et al. .......................... 713/1 |
| 7,401,332 B2 * | 7/2008 | Foster et al. ................. 717/175 |
| 7,418,474 B2 * | 8/2008 | Schwab ....................... 709/203 |
| 7,512,654 B2 * | 3/2009 | Tafoya et al. ................ 709/204 |
| 7,516,450 B2 * | 4/2009 | Ogura ......................... 717/168 |
| 7,529,903 B2 * | 5/2009 | Boss et al. ................... 711/165 |
| 7,552,431 B2 * | 6/2009 | Napier et al. ................ 717/169 |
| 7,581,217 B2 * | 8/2009 | Jhanwar et al. ............. 717/168 |
| 2004/0060044 A1 | 3/2004 | Das et al. |

OTHER PUBLICATIONS

Dutta et al, "STORM an approach to databse storage management in clustred storage environments" IEEE, CCGrid, pp. 1-8, 2007.*
Graefe, "Implementing sorting in database systems", ACM Computing Surveys, vol. 38, article 10, pp. 1-37, 2006.*
Chlebus et al, "Cooperative asynchronous update of shared memory", ACM STOC, pp. 733-739, 2005.*
Biveinis et al, "Towards efficient main memory use for optimum tree index update", ACM PVLDB, pp. 1617-1622, 2008.*
Final Rejection Mailed on Feb. 22, 2010 for U.S. Appl. No. 11/396,060, filed Mar. 31, 2006.
Amendment to Non-Final Rejected Filed on Oct. 22, 2009 for U.S. Appl. No. 11/396,060, filed Mar. 31, 2006.
Non-Final Rejection Mailed on Sep. 8, 2009 for U.S. Appl. No. 11/396,060, filed Mar. 31, 2006.

* cited by examiner

*Primary Examiner*—Anil Khatri

(57) ABSTRACT

In a method of updating software on a dormant disk, exposed files are accessed. The exposed files are exposed by mounting the dormant disk. The exposed files are scanned to determine the status of software residing on the dormant disk. The scanning is achieved without requiring booting of the dormant disk. It is determined whether an update is available for the software residing on the dormant disk.

19 Claims, 8 Drawing Sheets

4000

```
ACCESSING EXPOSED FILES, THE EXPOSED FILES BEING
EXPOSED BY MOUNTING OF A DORMANT DISK.
4005
```
↓
```
SCANNING THE EXPOSED FILES TO DETERMINE THE STATUS
OF SOFTWARE RESIDING ON THE DORMANT DISK, THE
SCANNING ACHIEVED WITHOUT REQUIRING BOOTING OF
THE DORMANT DISK.
4010
```
↓
```
DETERMINING WHETHER AN UPDATE IS AVAILABLE FOR THE
SOFTWARE RESIDING ON THE DORMANT DISK.
4015
```
↓
```
APPLYING AN UPDATE TO THE SOFTWARE RESIDING ON THE
DORMANT DISK.
4020
```
↓
```
GENERATING A NOTIFICATION TO INDICATE THE DORMANT DISK
IS IN NEED OF AN UPDATE.
4025
```

FIG. 4

UPDATING SOFTWARE ON DORMANT DISKS

BACKGROUND OF THE INVENTION

1. Field of the Invention

Embodiments of the present invention relate to the field of computer software and mechanisms for keeping computer software up-to-date. More specifically, embodiments of the present invention are directed to a technology for updating software on dormant disks.

2. Description of the Related Art

The advantages of virtual machine technology have become widely recognized. Among these advantages is the ability to run multiple virtual machines on a single host platform. This can make better use of the capacity of the hardware, while still ensuring that each user enjoys the features of a "complete" computer. An additional benefit of virtualization, in some implementations, is greater security. For instance, virtualization increases security by isolating potentially unstable or unsafe software so that it cannot adversely affect the hardware state or system files required for running the physical (as opposed to virtual) hardware.

As is well known in the field of computer science, a virtual machine (VM) is a software abstraction, or "virtualization," of an actual physical computer system. FIG. 1 shows one possible arrangement of a computer system 700 that implements virtualization. FIG. 1 shows a plurality of virtual machines (VMs) 200-200n and a plurality of virtual machine monitors (VMMs) 300-300n, coupled to an exemplary system hardware platform 100. An optional kernel 600 (used in non-hosted systems) is also shown. Additionally, an operating system 420, with applications 430, is shown with optional couplings to system hardware 100 and VMMs 300-300n.

In FIG. 1, a virtual machine (VM) 200, which in this system is a "guest," is installed on a "host platform," or simply "host," which includes system hardware 100 and one or more layers or co-resident components comprising system-level software, such as OS 420 or similar kernel 600, VMMs 300-300n, or some combination of these. As software, the code defining VM 200 will ultimately execute on the actual system hardware 100.

As in almost all computers, this system hardware 100 will typically include one or more CPUs 110, some form of memory 130 (volatile and/or non-volatile), one or more storage devices such as one or more disks 140, and one or more devices 170, which may be integral or separate and removable. In many existing virtualized systems, the hardware processor(s) 110 are the same as in a non-virtualized computer with the same platform, for example, the Intel x-86 platform. Because of the advantages of virtualization, however, some hardware vendors have proposed, and are presumably developing, hardware processors that include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one storage device such as virtual disk 240, and one or more virtual devices 270. Note that virtual disk 240 and physical disk 140 are also "devices," but are shown separately in FIG. 1 because of the important roles they play. All of the virtual hardware components of VM 200 may be implemented in software to emulate corresponding physical components. The guest system software 202 typically includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, for example, some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM 200 may (but need not) be configured with more than one virtualized physical and/or logical processor. By way of example, FIG. 1 illustrates multiple virtual processors 210a, 210b, ..., 210c (VCPU0, VCPU1, ..., VCPUm) within the VM 200. Each virtualized processor in VM 200 may also be multi-core, or multi-threaded, or both, depending on the virtualization. This invention may be used to advantage regardless of the number of processors the VMs are configured to have.

If VM 200 is properly designed, applications 260 running on VM 200 will function as they would if run on a "real" computer. This occurs even though the applications are running at least partially indirectly, that is via the guest OS 220 and virtual processor(s) (210a-210m). Executable files will be accessed by guest OS 220 from virtual disk 240 or virtual memory 230, which will be portions of the actual physical disk 140 or physical memory 130 allocated to VM 200. Applications may be installed within VM 200 in a conventional manner, using guest OS 220. Guest OS 220 retrieves files required for the execution of such installed applications from virtual disk 240 in a conventional manner.

Some interface is generally required between the guest software within a VM and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

As FIG. 1 illustrates, a virtualized computer system may (and usually will) have more than one VM (200-200n), each of which may be running on its own VMM (300-300n). The various virtualized hardware components in VM 200, such as virtual CPU 210, virtual memory 230, virtual disk 240, and virtual device(s) 270, are shown as being part of VM 200 for the sake of conceptual simplicity. In actuality, these "components" are often implemented as software device emulators 330 included in VMM 300. One advantage of such an arrangement is that VMM 300 may (but need not) be set up to expose "generic" devices. Exposing generic devices facilitates, for example, migration of VM 200 from one hardware platform to another.

As FIG. 1 illustrates, a virtualized computer system may (and usually will) have more than one VM (200-200n), each of which may be running on its own VMM (300-300n). The various virtualized hardware components in VM 200, such as virtual CPU 210, virtual memory 230, virtual disk 240, and virtual device(s) 270, are shown as being part of VM 200 for the sake of conceptual simplicity. In actuality, these "components" are often implemented as software device emulators 330 included in VMM 300. One advantage of such an arrangement is that VMM 300 may (but need not) be set up to expose "generic" devices. Exposing generic devices facilitates, for example, migration of VM 200 from one hardware platform to another.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, this invention is not restricted to use in systems with any particular "degree" of virtualization and is not to be limited to any particular notion of full or partial ("para-") virtualization.

In addition to the distinction between full and partial virtualization, two configurations of intermediate system-level software layer(s), "hosted" and "non-hosted," are in general use. In a hosted virtualized computer system, an existing, general-purpose operating system 420 forms a "host" OS that is used to perform certain input/output (I/O) operations, alongside and sometimes at the request and direction of the VMM 300. The optional coupling between OS 420 and VMM 300 provides one conduit for such communication. In a hosted system, optional kernel 600 is not utilized, and VMM 300 is instead coupled directly to system hardware 100. The host OS in OS 420 and VMM 300 are both able to directly access at least some of the same system hardware resources 100, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In a non-hosted system, VMM 300 is deployed on top of an optional software layer called a "hypervisor," or kernel 600. Kernel 600 is constructed specifically to provide efficient support for VM 300. Compared with a hosted system in which VMM 300 runs directly on the hardware platform, use of kernel 600 offers greater modularity. Use of kernel 600 also facilitates provision of services, such as resource management, that extend across multiple VMs. As contrasted with a hosted environment where kernel 600 is not used, a non-hosted environment may offer greater performance because kernel 600 can be co-developed with VMM 300. Co-development enables optimization of the characteristics of a workload consisting primarily of VMs/VMMs. Additionally, in a non-hosted system, operating system 420 does not utilize the optional coupling shown between OS 420 and VMM 300.

As a generalization, some form of "virtualization software" executes between system hardware 100 and one or more VMs 200. The virtualization software uses the resources of the system hardware 100, and emulates virtual system hardware 201, on which guest system software 202 and guest applications 260 appear to execute. Thus, virtualization software typically comprises one or more device emulators 330 that either include or execute in conjunction with some form of system software for accessing and controlling the system hardware 100. As previously described, the virtualization software may provide full virtualization or partial virtualization. In the non-hosted virtual computer system, the virtualization software primarily comprises VMM 300 and may include some portions of kernel 600. Similarly, in the hosted virtual computer system, the virtualization software primarily comprises VMM 300. Various other configurations for virtualization software and system software are also possible.

Independent of virtualizing the entire operating system of a computer is the concept of virtualizing only the files and storage devices for a computer. Only a few years ago many computers were required to have local disk storage. However, today it is also possible to boot a physical computer or a virtual machine from a virtual disk or from an image that is stored on a server. The increased use of physical computers and of virtual machines, which allow easy proliferation of numerous virtual disks, has lead to a dramatic increase in the number of disks in use. Likewise, many companies and individuals use templates, images, or backups that are static and then applied to machines for booting machines or to configuring machines. Additionally, physical and virtual computers may still use local or remote physical disks, or other physical or logical storage elements that are decoupled from the physical computer via a storage area network (SAN) or internet small computer system interface (iSCSI). Thus, the concept of "disks" includes, but is not limited to, real disks, virtual disks, logical disks, suspended disks, disk snapshots, images, templates, storage area networks, local storage, remote storage, and backup storage.

In an environment that allows so many disk configurations to be created so easily, many of the configurations will often go unused or dormant for some extended period of time such as days, weeks, or longer. A "dormant disk" can be defined as a disk that is not in use. Essentially any file that can be booted or booted from can be considered a dormant disk when it is not in use. A dormant disk typically becomes active when it is booted. However, a dormant disk can become active when it or its contents is attached to a computer (real or virtual) and the computer is powered on.

When unused, dormant disks often go out-of-date, because they do not incorporate the latest updates, such as software and virus related revisions and patches. Starting up such a dormant disk without the latest updates risks exposure to viruses and worms. Additionally, starting up such a dormant disk without the latest updates can cause the computer to attempt to use software which is out-of-date. Even if updates are installed immediately after booting the previously dormant disk, there is still a window of risk of virus infection, attack, or software malfunction. That is, the risks associated with out-of-date disks exist until the out-of-date disk is brought up-to-date. Additionally, a rapid increase in the number of dormant disks is occurring due in part to the trend towards separating storage from computing resources, the rise of "disk imaging" software, and the growing popularity of virtual machine technology, all of which contribute to a proliferation of dormant disks. This increase in dormant disks simply expands the previously described risks.

It should be understood that conventional technologies are only able to update active disks. That is, in order to scan and/or update the software of an active disk, existing solutions depend on the existence of a computer that has booted from the disk. Existing solutions also depend on having the disk's software, especially the operating system, loaded into a computer's memory. These dependencies arise because the existing solutions interact with the loaded operating system in order to coordinate the scan and/or update process for the disk. In an agent-based scanning/updating model, the loaded software includes an agent which interacts with the loaded operating system. While in an agentless scanning/updating model, an external update server interacts with the operating system over a network. In either model, the loaded software typically participates in its own update by writing a newer version of itself onto the activated disk, such that the next time the disk is booted, the newer version will be loaded.

These existing solutions are unable to update a dormant disk since, by definition, no computer has booted from a dormant disk. Instead, these existing "brute-force" methods rely on first booting the dormant disk using a computer to make the disk active. Once the disk is active, the existing scan and/or update processes can then be run. However, booting a disk to perform scans and/or updates creates several problems.

One problem associated with booting dormant disks to perform scans and/or updates is decreased efficiency. The only resource used by a dormant disk is storage space. However, powering on a computer to scan and/or update a dormant disk costs CPU (computer processing unit) cycles and memory. CPU cycles and memory can be scarce resources in a computing environment, especially if the number of dormant disks is large compared to the number of computing resources.

Another problem is rooted in the existing solutions' reliance on a functioning internet protocol. The internet protocol is used to retrieve and deliver the actual updates (patches, revisions, new software versions, virus signatures, and etc.) to the computer that has booted from the disk being updated. If for any reason the network is down when the computer is booted, the computer and its disk cannot be scanned and software updates cannot be delivered to that computer for local installation.

Yet another problem exists because the software to be updated may be required to participate in its own update. For example, consider an update that installs a newer version of the operating system (OS). Suppose that this newer OS version contains a fix to a bug that allows an external network virus to attack and infiltrate the OS. Since the update process temporarily involves running the old version of the OS, booting a dormant disk in order to update it offers a window of vulnerability in which the disk may be compromised, infected, or attacked before the update is installed.

As yet another drawback, in one existing method of scanning and/or updating an out-of-date disk, the out-of-date disk is scanned and/or updated in a quarantined environment. In such an approach a disk is isolated from a network. The disk is then made active and the scanning and/or updating process is started. At this point, a user somehow determines what updates are available and goes about acquiring them. For example, a user can copy all of the updates to a CD-ROM (Compact Disk-Read Only Memory) or DVD-ROM (Digital Versatile Disk-Read Only Memory) using another computer system. These updates are then copied to the quarantined disk so that they can be applied. As this process is done without a network connection to the quarantined disk, it is cumbersome, inconvenient, time consuming, prone to error, and requires extensive human interaction.

With the proliferation of easily created virtual disks and virtual machines as described above, some systems may contain many thousands of potentially dormant disks. Thus, the amount of time spent updating a single dormant disk is multiplied many times for a system or entity that has multiple dormant disks. Hence, the inefficiencies and tedious nature of rendering dormant disks active in order to perform scans and/or updates thereon is a significant problem in today's computing environment.

SUMMARY OF THE INVENTION

In a method of updating software on a dormant disk, exposed files are accessed. The exposed files are exposed by mounting the dormant disk. The exposed files are scanned to determine the status of software residing on the dormant disk. The scanning is achieved without requiring booting of the dormant disk. It is determined whether an update is available for the software residing on the dormant disk, such that, if an update is available, embodiments of the present invention provide various methods for applying the update to the dormant disk in ways that do not require booting of the dormant disk.

Furthermore, in a computer readable medium having computer-readable code embodied therein for causing a computer system to perform a method of updating software on a dormant disks, exposed files are accessed. The exposed files are exposed by mounting the dormant disk. The exposed files are scanned to determine the status of software residing on the dormant disk. The scanning is achieved without requiring booting of the dormant disk. It is determined whether an update is available for the software residing on the dormant disk, such that, if an update is available, embodiments of the present invention provide various methods for applying the update to the dormant disk in ways that do not require booting of the dormant disk.

In another embodiment, a system for updating software on a dormant disk comprises a controller configured to couple to a file system interface. The controller is for coordinating system actions performed on the dormant disk. A utility package is coupled to the controller. The utility package is for performing tasks related to the dormant disk. A software repository is coupled to the controller. In this embodiment, the scanning and updating operations are performed without requiring booting of the dormant disk.

In yet another embodiment, a system for updating software on a dormant disk comprises a controller configured to couple to a file system interface. The controller is for coordinating system actions performed on the dormant disk. A utility package is coupled to the controller. The utility package is for performing tasks related to the dormant disk. A virtual environment is configured to couple between the file system interface and a software repository. The virtual environment is also configured to interact with components of the software repository to achieve scanning and updating operations on the dormant disk. In this embodiment, the scanning and updating operations are performed without requiring booting of the dormant disk.

BRIEF DESCRIPTION OF THE DRAWINGS

The accompanying figures, which are incorporated in and form a part of this specification, illustrate embodiments of the technology for updating software on dormant disks and, together with the description, serve to explain principles discussed below.

FIG. 4 is a flow diagram of a method for updating software on dormant disks, according to one embodiment of the present invention.

DETAILED DESCRIPTION

Figure 1:
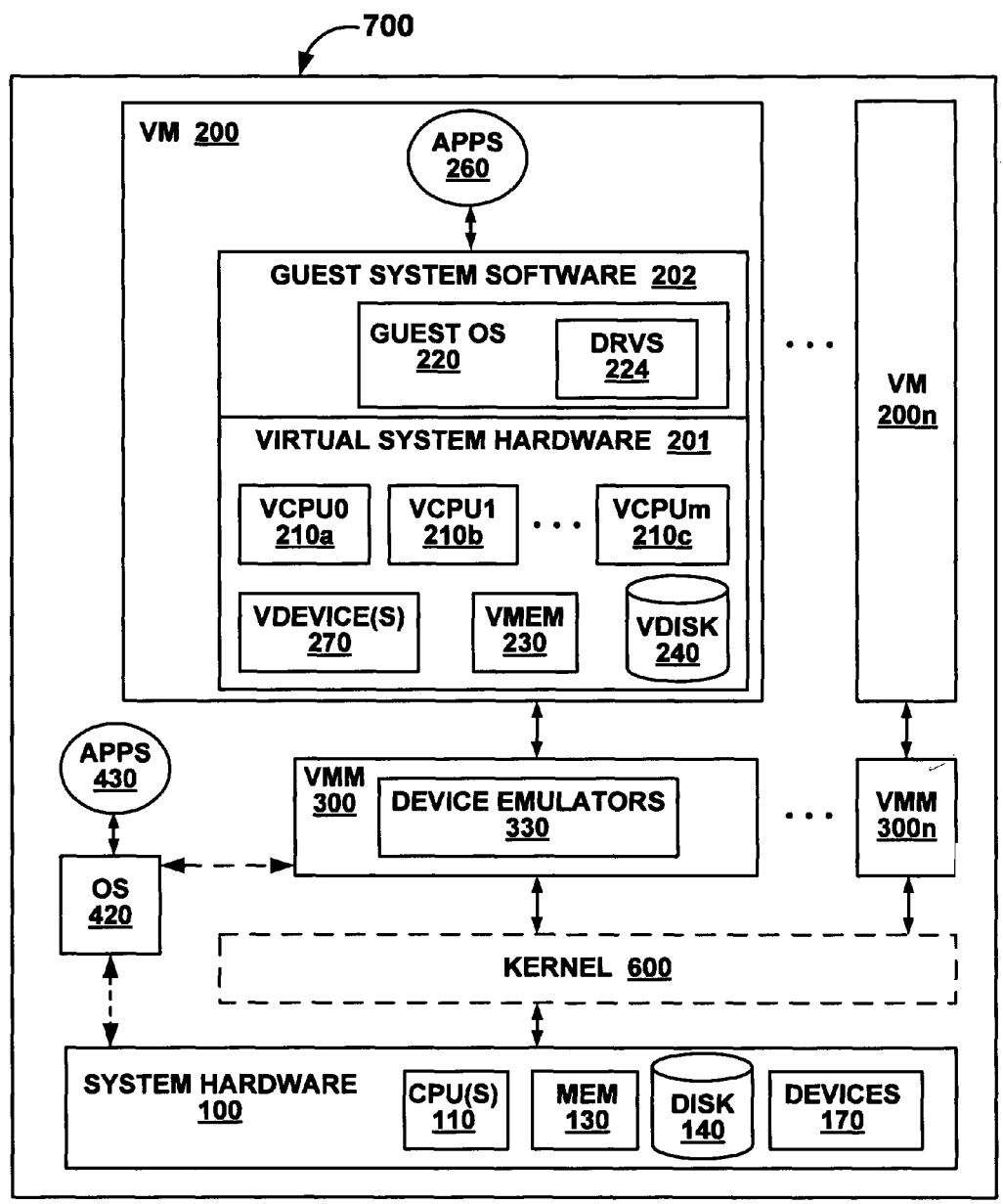
FIG. 1 is a diagram of an exemplary virtualized computer system upon which embodiments of the present technology for updating software on dormant disks may be practiced.

Reference will now be made in detail to embodiments of the present technology for updating software on dormant disks, examples of which are illustrated in the accompanying drawings. While the technology for updating software on dormant disks will be described in conjunction with various embodiments, it will be understood that they are not intended to limit the present invention to these embodiments. On the contrary, the technology for updating software on dormant disks is intended to cover alternatives, modifications and equivalents, which may be included within the spirit and scope the various embodiments as defined by the appended claims. Furthermore, in the following detailed description, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "scanning", "determining", "applying", "generating", "utilizing", "storing", "causing", "coupling", "employing", "performing", "providing", "interfacing", "detecting", "creating", "coordinating", "scanning", "scheduling", and "updating", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers. Additionally, it should be understood that in embodiments of the invention, one or more of the steps can be performed manually.

General Description of Updating Software on Dormant Disks

As an overview, one embodiment of the present invention is directed toward a method of updating software on dormant disks. In one embodiment of this method, a dormant disk is mounted and the files exposed by mounting the disk are accessed. The exposed files on the dormant disk are scanned to determine the status of software residing on the dormant disk. The scanning is done without requiring the booting of the dormant disk. The scanning is performed utilizing either a direct or an indirect scanning approach, as described in embodiments of the present invention. It is determined whether an update is available for the software residing on the dormant disk, such as for software that is out-of-date, infected, in need of installation, or in need of a virus patch. In one embodiment, a notification is generated to indicate that the dormant disk is in need of an update.

In one embodiment, an update is applied immediately to the software residing on the dormant disk, without requiring the disk to be booted. This is done with either a direct or an indirect approach, as described in embodiments of the present invention. In another embodiment, the dormant disk is prepared for a subsequent self-update. In such a self-update embodiment, an update file and a control script are stored on the dormant disk without requiring the dormant disk to be booted. Storing of the update file can be performed with either a direct or an indirect approach, as described in embodiments of the present invention. When the dormant disk is next booted, the control script executes and directs updates from the update file stored on the dormant disk. Additionally, in various embodiments one or more processes of this method, such as accessing files, scanning, or applying updates, is performed at a scheduled time.

Exemplary System

Figure 2:
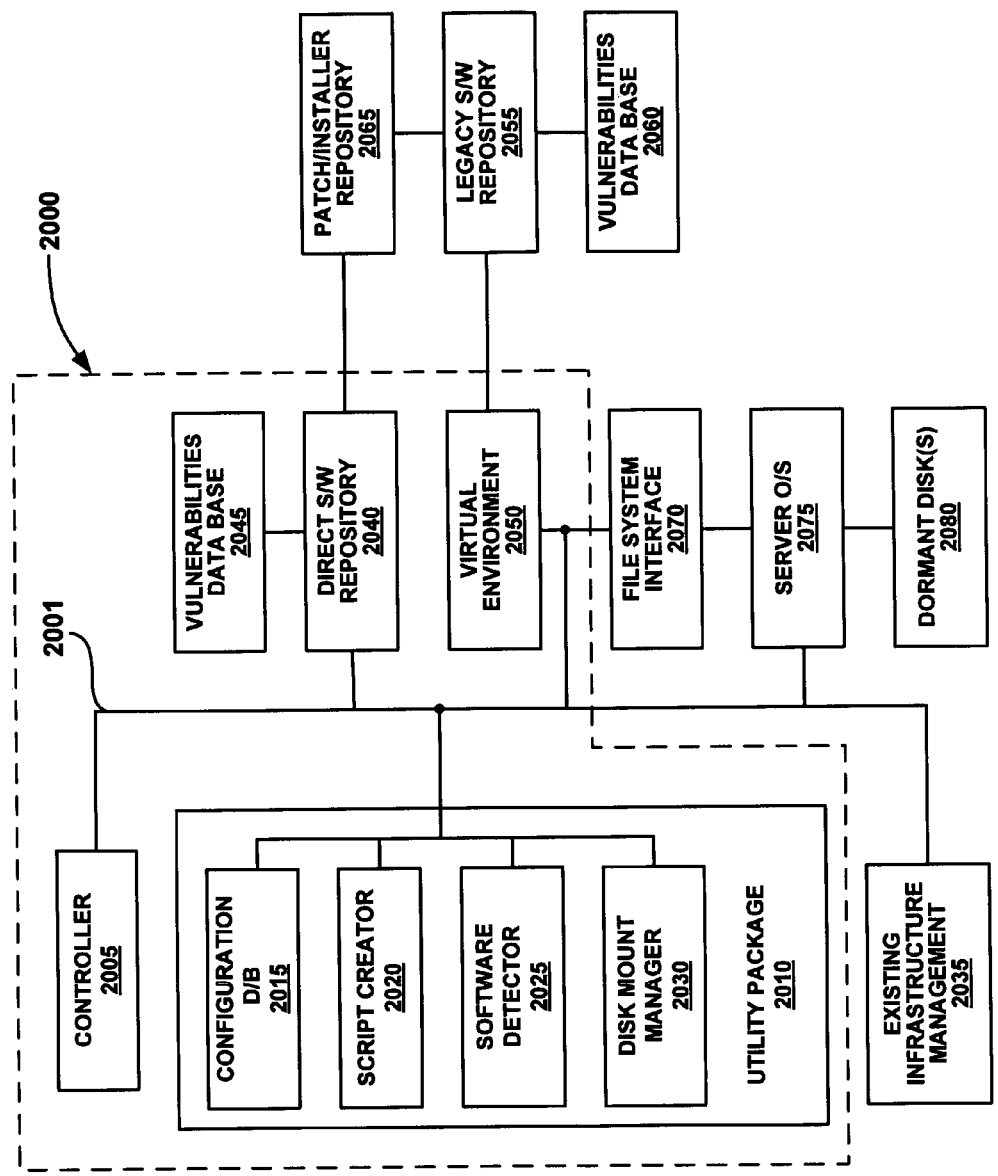
FIG. 2 is block diagram of components of an exemplary system for updating software on dormant disks, according to one embodiment of the present invention.

With reference now to FIG. 2, a diagram of one embodiment of the present system 2000 for updating software on dormant disks is shown. The following discussion will begin with a description of the physical structure of the present system 2000 for updating software on dormant disks. This discussion will then be followed with a description of the operation of specific components of system 2000. Discussion will then proceed to descriptions of exemplary methods for using system 2000 to scan and update software on a dormant disk.

Physical Structure

With respect to the physical structure, system 2000 is comprised of a controller 2005, a utility package 2010, a vulnerabilities database 2045, a direct software repository 2040, a virtual environment 2050, and a bus 2001. Though shown in FIG. 2, direct software repository 2050 and vulnerabilities database 2045 are only necessary in a system 2000 that is configured to utilize a direct scanning and/or updating approach. The direct scanning and/or updating approach will be described in detail below. Similarly, though shown in FIG. 2, virtual environment 2050 is only necessary in a system 2000 that is configured to utilize an indirect scanning and/or updating approach. The indirect scanning and/or updating approach will be described in detail below. Bus 2001 couples controller 2005 to utility package 2010, direct software repository 2040, and virtual environment 2050. Bus 2001 also provides a coupling to various components of a computing environment that system 2000 is configured to couple with, such as: existing infrastructure management 2035, file system interface 2070, and server operating system 2075.

In one embodiment, utilities package 2010 is comprised of: configuration database 2015, script creator 2020, software detector 2025, and disk mount manager 2030, all of which are coupled to bus 2001. Direct software repository 2040 (when included) is coupled to vulnerabilities database 2045, to an external patch/installer repository 2065, and to file system interface 2070 (through bus 2001). Virtual environment 2050 (when included) is coupled to a legacy software repository 2055 and to file system interface 2070 (through bus 2001). Legacy software repository 2055 is coupled to patch/installer repository 2065 and to vulnerabilities database 2060. Additionally, as shown in FIG. 2, server operating system 2075 is coupled to bus 2001. Server operating system 2075 is also coupled to one or more dormant disks 2080. As will be described in detail below system 2000 is used to scan and/or update dormant disks 2080.

Exemplary Controller

Figure 3:
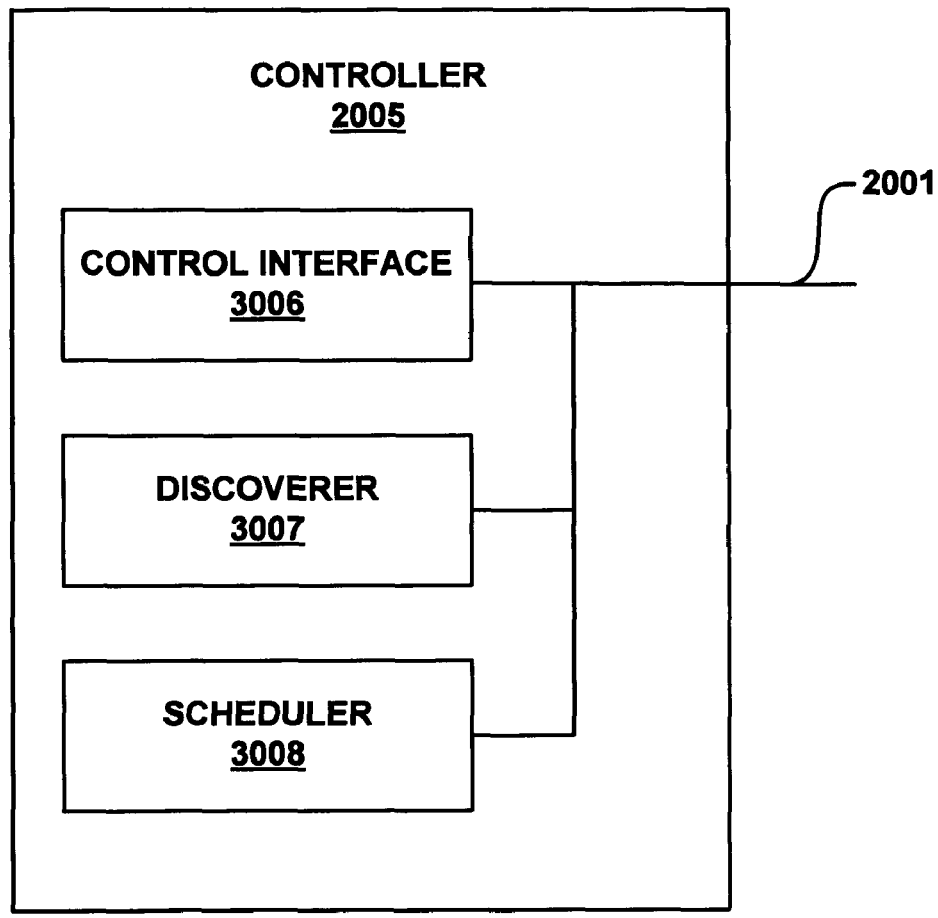
FIG. 3 is a block diagram of an exemplary controller used in a system for updating software on dormant disks, according to one embodiment of the present invention.

FIG. 3 is a block diagram of an exemplary controller 2005 used in a system 2000 (FIG. 2) for updating software on dormant disks, according to one embodiment of the present invention. In one embodiment, as shown in FIG. 4, controller 2005 is comprised of a control interface 3006, a discoverer 3007, and a scheduler 3008, all of which are coupled to bus 2001. Controller 2005 is a central component of system 2000 (FIG. 2). Controller 2005 is configured to couple to file system interface 2070. Controller 2005 is for coordinating system actions performed on, or in conjunction with, dormant disk 2080 (FIG. 2). Controller 2005 coordinates actions such as setup, scheduling, scanning, and updating tasks performed by system 2000.

Controller 2005 is configured to indirectly access and/or control elements of the computing environment through the services of existing management infrastructure 2035 (FIG. 2). In the present invention, the computing environment comprises discoverable devices such as servers, operating systems, software, real and virtual computers, and real and virtual disks that controller 2005 can discover and couple to. In one embodiment, existing management infrastructure 2035 comprises software applications such as: systems management applications, storage management applications, virtual machine monitors, and disk image managers. Such existing management applications provide a built in means for discovering and managing computers, networks, software, storage devices, storage networks, virtual machines, virtual disks, disk images, and other devices, systems, and configurations that exist in the computing environment. Controller 2005 is illustrated and described separately in the present application for purposes of clarity. However, it is appreciated that in many embodiments, controller 2005 is integrated into one of the infrastructure management applications 2035, such as a virtual machine monitor.

Control interface 3006 provides setup and management interfaces for interacting with system 2000 to update software on a dormant disk, such as dormant disk 2080. Control interface 3006 allows a human administrator or program to set up, manage, and interact with system 2000 and controller 2005. This setup, management, and interaction are facilitated by use of interfaces such as a Graphical User Interface (GUI), a Command Line Interface (CLI), an Application Programming Interface (API), or some combination of these interfaces or the like. A GUI can be implemented on the same computer that is hosting system 2000, or on a different computer. When implemented on a different computer, the GUI communicates with system 2000 over a network software interface such as hypertext transfer protocol. A CLI allows a user to write or run a script or program to control system 2000. This is useful, for instance, to automate repetitive tasks. An API allows a user to write a program that controls system 2000 for automation or integration purposes.

Through the use of control interface 3006, a human, a program, or a script interacts with controller 2005 to configure settings for controller 2005 and system 2000. These settings are stored in configuration database 2015 (FIG. 2). Settings include items such as: what type of existing infrastructure management tools 2035 (FIG. 2) are to be interacted with; policies for performing scans and updates on dormant disks (2080); and schedules for scanning and updating one or more disks at predefined times. A policy, for instance, controls how system 2000 alerts the consumer when a disk in need of updating is found. A policy also controls whether a disk in need of updating should be automatically updated. A policy also controls how different types of active and dormant disks should be treated. A policy can also specify a list of software products that must be present on a computer disk. As will be described below, in various embodiments of the present invention, if a disk is found without a specified product during a scan, the missing product can automatically be added during an update.

Discoverer 3007 is configured for interfacing with an existing management infrastructure 2035. Discover 3007 is configured for scanning a computing environment to enumerate devices coupled to controller 2005 and system 2000 within the computing environment. The enumeration takes place in conjunction with a discovery process performed in the computing environment that system 2000 is coupled to. In the discovery process devices in the computing environment, such as operating systems, servers, computers, and disks are enumerated. Discoverer 3007 also determines how the enumerated disks are configured, what devices they are hosted on, and what computers, if any they are attached to. Discoverer 3007 obtains information by querying management applications 2035, by scanning the computing environment directly, by drawing information from data manually entered by a user or program through control interface 3006, or by a combination of these sources. Information obtained by discoverer 3007 is stored in configuration database 2015 (FIG. 2).

Discoverer 3007 also probes hardware devices directly. Discoverer 3007 uses methods such as network probing to discover hardware devices and map out their topology. The discovered topology is stored in configuration database 2015 and updated periodically as the computing environment changes. In one embodiment, discoverer 3007 explicitly identifies a disk by using conventions such as a disk array identifier, a SCSI (small computer system interface), a device number, a logical unit number, or other known conventions. In one embodiment, discoverer 3007 also identifies a disk through the computer that uses it. For example when a computer (real or virtual) is specified, discoverer 3007 queries the existing infrastructure management 2035 to obtain a mapping between the computer and its disk or disks. Mappings of identified computers and disks are stored in configuration database 2015 and updated periodically as the computing environment changes.

Discoverer 3007 also queries existing infrastructure management 2035 to determine which mapped disks are dormant and which mapped disks are active. A disk is identified as dormant if it is associated with no physical or virtual computer, or else is associated with a physical or virtual computer that is currently dormant. Information received regarding dormant and active disks is stored in configuration database 2015 and updated periodically as the computing environment changes. Such a mapping is useful in determining which disks to scan and/or update. Additionally, such a mapping is useful to automatically perform scheduled scans and/or updates of dormant disks in the computing environment of system 2000.

Information collected by discoverer 3007 is utilized by system 2000 to determine which disks are dormant, what method to use for accessing a particular dormant disk, which software products to scan for on a dormant disk, and what methods should to use when performing scans and/or updates on a particular dormant disk. Thus information, collected by discoverer 3007 is beneficially utilized by controller 2005 to coordinate the actions of dormant disk scanning and updating that are described in detail below.

Scheduler 3008 is for scheduling tasks related to scans and updates of the software residing on a dormant disk, such as dormant disk 2080. Scheduler 3008 is utilized in conjunction with control interface 3006 to configure a schedule for scanning and/or updating dormant disks enumerated by discoverer 3007. For example, for each enumerated dormant disk a schedule can be set to specify the time and/or frequency with which the dormant disk should be scanned and updated. As will be explained further below, embodiments of the present invention lend themselves to several types of scanning and updating. Scheduler 3008 is also utilized to configure and schedule the type of scan and/or update to be performed on a dormant disk. Schedule information is stored and maintained in configuration database 2015, in one embodiment of the present invention.

Scheduler 3008 provides a means for efficiently allocating resources of the scanning and updating methods that are described in detail below. For instance, scheduler 3008 can be used to solve resource constraint problems by scheduling scans and/or updates of dormant disks when computing resources such as servers have lower work loads. Thus, use of scheduler 3008 is beneficial to a method and system for updating dormant disks, as scheduler 3008 allows controller 2005 to efficiently utilize a single server to perform scans and/or updates on a large number of dormant disks, without overtaxing the server.

Exemplary Utility Package

Referring again to FIG. 2, utility package 2010 is coupled to controller 2005 and provides utilities for performing tasks related to a dormant disk, such as dormant disk 2080. In one embodiment of the present invention, utility package 2010 is comprised of a configuration database 2015 utility, a script creator 2020 utility, a software detector 2025 utility, and a disk mount manager 2030 utility. In other embodiments of the present invention, utility package 2010 is comprised of more utilities or less utilities than shown in FIG. 2.

Configuration database 2015 is for storing and providing access to schedule information, configuration information, enumerated devices, and policies. Configuration database 2015 contains the settings necessary for system 2000 to perform its work and interact with enumerated devices in its environment. Configuration database 2015 also contains information about the computing environment that system 2000 operates in. This computing environment information allows controller 2005 and other components of system 2000 to interact with elements of the environment such as computers, disks, networks, and other software programs.

In addition, configuration database 2015 also stores a list of software products supported by system 2000. For each supported software product, configuration database 2015 also contains specifications for how the software product is to be scanned and updated if found on a dormant disk, such as dormant disk 2080. Such specifications indicate whether a particular product or disk is to be scanned with a direct or indirect scanning approach. Additionally, such specifications indicate whether updates to a particular product or disk are to be applied immediately or in a delayed manner (self-update). If done immediately, the update is installed immediately onto the dormant disk, using either the direct or indirect approach. If using a self-update method, an update file or patch is immediately stored on the dormant disk, but is installed at some later time. Another specification indicates whether scan and update tasks are to be conducted separately or in combination for a particular dormant disk. The contents of configuration database 2015 can be stored, for example, on disk, using well known technologies. Information in configuration database 2015 is populated as described above, and can also be populated from an external source through the use of control interface 3006.

Script creator 2020 is for creating an executable control script for storing on a dormant disk, such as dormant disk 2080. Script creator 2020 is utilized in self-update embodiments of the present invention that require dormant disk 2080 to be booted to fully apply updates. In such self-update embodiments, update files to perform necessary updates are also stored on a mounted volume of dormant disk 2080. Script creator 2020 receives information from controller 2005 regarding the type of operating system on dormant disk 2080, software products to be updated, and a list of updates to be applied. Script creator 2020 utilizes this information to create an executable or self-executing script. Script creator 2020 passes the script to controller 2005 for storing on dormant disk 2080. The script is stored in the executable volume of the primary operating system volume of mounted dormant disk 2080. The script contains a sequence of instructions that coordinate the update process for software products found to be out-of-date as a result of a scan performed on a dormant disk. The script includes instructions for accessing and executing any update files that are stored on dormant disk 2080 in conjunction with the script. In some embodiments, the script also includes instructions to reboot the operating system on the disk after installation of the updates.

Script creator 2020 tailors the script based on the operating system of dormant disk 2080. Script creator 2020 also configures the operating system stored on dormant disk 2080 to run the stored script. This is done in different ways depending on the operating system family that the script is configured for use with. For instance, in one embodiment, an entry that references the stored script is added to a startup configuration file. In another embodiment the script is placed in a special folder designed to hold boot-time programs. Script creator 2080 also includes information in a script to prevent it from executing more than once. Such info can comprise instructions for a script to erase itself or hide itself after it has been executed.

Software detector 2025 is for detecting software configurations on a mounted dormant disk, such as dormant disk 2080. Software configurations comprise configurations of software products such as operating systems and applications. The software inventory is optionally stored, for instance in a memory cache or in configuration database 2015, to improve performance. Software detector 2025 is configured to couple to and utilize file system interface 2070 to analyze the file system contents of a mounted dormant disk 2080 in order to discover installed software products. A result of the analysis is the generation of a software inventory. Software detector 2025 compares the generated software inventory against the software product configuration information stored in configuration database 2015. Based on this comparison, software detector 2025 determines which products on mounted dormant disk 2080 are eligible for scanning and/or updating. Although software is inventoried and compared against a stored configuration prior to scanning dormant disk 2080 for out-of-date status, this comparison is not necessary prior to scanning software on dormant disk 2080 for virus disinfection purposes.

Software detector 2025 also analyzes a dormant disk, such as dormant disk 2080, and detects software configurations. Software configurations comprise information about the type of operating system, the system volume, and the system folder residing on dormant disk 2080. With respect to operating systems, a bootable disk contains at least one operating system. If the bootable disk contains more than one operating system, one of the operating systems is designated as the primary operating system that will be loaded into memory during a boot process if no special user actions are taken. The files of the primary operating system are typically stored in a system folder residing within the file system of a system volume on dormant disk 2080.

Software detector 2025 detects operating systems by inspecting well-known data blocks and/or files on dormant disk 2080 where this information is stored. For example, a disk containing an operating system from Microsoft Corporation typically has a volume containing a "boot.ini" file, which software detector 2025 interacts with. The "boot.ini" file contains a list of volumes and operating systems. Each stored operating system specifies whether it is the default operating system, the volume on which it resides, and the location of its system folder within that volume. In this example, software detector 2025 gathers detailed information about the operating system by inspecting files within the system folder. For example, software detector 2025 determines the type and version of the operating system from the existence, name, and version of certain known files.

Software detector 2025 utilizes a similar process to detect installed applications residing on dormant disk 2080. For instance, a specific application is typically determined by the presence of known files associated with the application. Installed applications are also detected, in some embodiments, by inspecting the contents of certain operating system configuration files that reside on dormant disk 2080. For instance, in one embodiment, a Windows Registry file a on a Microsoft Corporation operating system, is inspected by software detector 2025 to detect installed applications.

Disk mount manager 2030 is for mounting and unmounting a dormant disk, such as dormant disk 2080. Disk mount manager 2030 exposes the file systems of dormant disk 2080 by logically connecting (mounting) dormant disk 2080 to server operating system 2075 through one of several mechanisms. Importantly, it should be noted that even though files are exposed when mounting a dormant disk, the dormant disk stays dormant, i.e. the dormant disk is not booted. Different mechanisms are utilized to mount different types of dormant disks such as physical disks, virtual disks, or disk images. Mounting dormant disk 2080 causes the disk to become accessible to software running on a server, in particular server operating system 2075. Dismounting dormant disk 2080 is essentially the reverse of mounting. Dismounting dormant disk 2080 from a mounted state disconnects it from server operating system 2075. Dismounting also causes dormant disk 2080 to become inaccessible to the software that was able to access files while dormant disk 2080 was mounted.

One mechanism for mounting a dormant physical disk involves a configuration where a physical disk resides on a device attached to a storage area network (SAN). If the server running system 2000 is also attached to the same SAN through a host bus adapter HBA, the dormant physical disk can be mounted by enabling a data path between the HBA and the dormant disk. This typically involves programming SAN devices, such as switches and disk arrays. Controller 2005 (FIG. 2) enables the data path by sending control commands to the SAN devices directly via the SAN or via an internetwork protocol (IP) network. In one embodiment, controller 2005 can also send commands to the SAN devices indirectly. Commands are sent indirectly by sending requests to a storage management application that resides in existing infrastructure management 2035.

Another mechanism for mounting a dormant physical disk is used if the dormant physical disk is hosted by a device residing on the IP network. If this is the case, the dormant physical disk is connected to a server though a network adapter using a protocol such as internet small computer system interface (iSCSI). Controller 2005 (FIG. 2) enables the data path by sending control commands to the iSCSI devices directly. Controller 2005 can also enable the data path indirectly by sending requests to a storage management application residing in existing infrastructure management 2035.

Virtual disks and disk images are files representing a disk. Mounting a dormant virtual disk or dormant disk image exposes an interface allowing software to access the contents of the virtual disk or disk image as a linear array of data blocks. A dormant virtual disk or dormant disk image can be logically connected (mounted) to the server running system 2000 through use of a virtual disk driver. The virtual disk driver makes a dormant virtual disk or dormant disk image appear as a physical disk device from the perspective of server operating system 2075 and other operating systems. This allows software, including applications and subsystems of server operating system 2075, to access the volumes and file systems contained within the dormant virtual disk or dormant disk image. Virtual disk drivers are implemented by controller 2005, and by other techniques known to those skilled in the art of operating system software development.

Controller 2005 and system 2000 can be utilized to perform scans and/or updates on one or more disks based on settings, configurations, schedules, and policies. The scans and/or updates can be initiated by a user, a program, a schedule, or some combination of these means of initiation.

Exemplary Methods of Operation

The following discussion sets forth in detail the operation of the present technology for updating software on dormant disks. With reference to FIG. 4, flowchart 4000 illustrates a flow diagram of a method for updating software on dormant computer disks, according to one embodiment of the present invention. Flowchart 4000 includes processes that, in various embodiments, are carried out by a processor under the control of computer-readable and computer-executable instructions. The computer-readable and computer-executable instructions reside, for example, in data storage features such as a portable diskette, a computer usable volatile memory 8008, computer usable non-volatile memory 8010, and/or data storage unit 8012 of FIG. 8. The computer-readable and computer-executable instructions are used to control or operate in conjunction with, for example, processor 8006A and/or processors 8006A, 8006B, and 8006C of FIG. 8. Although specific steps are disclosed in flowchart 4000, such steps are exemplary. That is, embodiments are well suited to performing various other steps or variations of the steps recited in flowchart 4000. It is appreciated that the steps in flowchart 4000 may be performed in an order different than presented, and that not all of the steps in flow chart 4000 may be performed.

Referring now to FIG. 2 and to flowchart 4000 of FIG. 4, at 4005 the present technology for identifying updating software on dormant disks accesses exposed files on a dormant disk. The exposed files are exposed by mounting of a dormant disk. In one embodiment, the direction to access exposed files on dormant disk 2080 is triggered at a scheduled time according to a schedule stored in configuration database 2015. In another embodiment, direction to access exposed files on dormant disk 2080 is based on a user input or program input received through control interface 3006 (FIG. 3).

In one embodiment, in response to a direction to access exposed files, controller 2005 invokes disk mount manger 2030 to mount the volumes of a dormant disk (such as dormant disk 2080) onto a server computer to which system 2000 has access. Disk mount manager 2030 notifies server operating system 2075 of the presence of dormant disk 2080, once dormant disk 2080 is accessible. Server operating system 2075 then typically employs a logical volume manager driver to analyze the disk and find one or more volumes. The logical volume manager then exposes every volume detected to one or more file system drivers. Each file system driver checks to see if the volume is formatted with a file system format known to the driver. If so, the volume is called a file system, and is available for mounting.

Server operating system 2075, or an alternative means, is used to expose one of many known interfaces on dormant disk 2080. Controller 2005 utilizes the exposed interface to direct a query of the accessible file systems on dormant disk 2080. Controller 2005 then mounts a chosen file system of dormant disk 2080 to an arbitrary mount point in the file and directory name space of server operating system 2075. After the chosen file system is mounted, utilities and programs (such as scanners and updaters) of system 2000 can access the exposed files and directories within the mounted file system. Access of this mount point is achieved by utilizing software operations defined by the file system programming interface of server operating system 2075. This combination of file system programming interface and server operating system 2075 form file system interface 2070 shown in FIG. 2.

Once dormant disk 2080 is mounted, controller 2005 instructs software detector 2025 to access the exposed files on the dormant disk through file system interface 2070. Software detector enumerates the exposed files and any software products installed on mounted dormant disk 2080. Information regarding the enumerated files and software products is compared to stored product information maintained in configuration database 2015. The comparison is used to determine which of the enumerated software products are supported by available scanners and updaters. Controller 2005 also consults policies and schedules to determine if any software products need to be installed or removed from the configuration that presently exists on dormant disk 2080.

Referring again to FIG. 4, at 4010 of flowchart 4000, the exposed files are scanned to determine the status of software residing on dormant disk 2080. The scanning is achieved without requiring booting of dormant disk 2080. In other words, the exposed files are on dormant disk 2080 are scanned while dormant disk 2080 remains in a dormant state.

Embodiments of the present system 2000 for scanning and updating software on dormant disks employ either a direct approach or an indirect approach to perform scanning and updating of dormant disks. In the direct approach, system 2000 utilizes direct software repository 2040 and vulnerabilities database 2045 to perform scanning and/or updating. In the indirect approach, system 2000 utilizes virtual environment 2050 to perform scanning and/or updating through a coupling to a legacy software repository 2055 and its associated vulnerabilities database 2060. The direct approach will be discussed first, followed by the indirect approach.

Direct Approach

Direct Approach—Immediate Scan and Update Methods

In many embodiments, scanning and/or updating of dormant disk 2080 is performed immediately upon direction by controller 2005 through the use of the direct approach described below. In the direct approach, scanning, as described at 4010 of flowchart 4000 is performed by software residing in direct software repository 2040.

Figure 5:
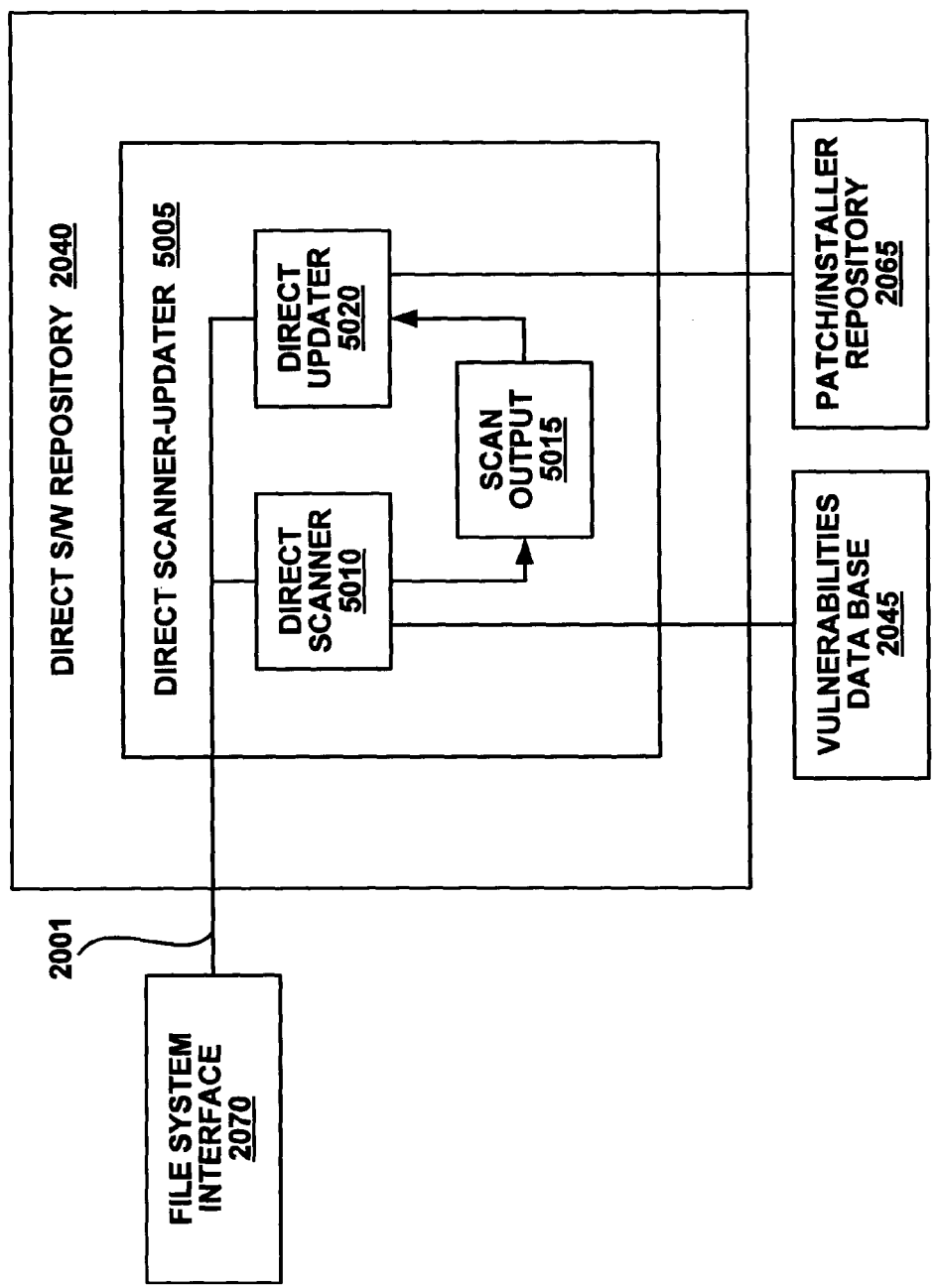
FIG. 5 is a block diagram of an exemplary direct software repository used in a system for updating software on dormant disks, according to one embodiment of the present invention.

FIG. 5 shows a block diagram of an exemplary direct software repository 2040 used in a system 2000 for updating software on dormant disks, according to one embodiment of the present invention. Direct software repository 2040 is coupled to controller 2005 (FIG. 2) via bus 2001. Direct software repository 2040 is also coupled to vulnerabilities database 2045 and to patch/installer repository 2065. Components of direct software repository 2040 are also configured to couple directly with a file system interface associated with dormant disk 2080, such as file system interface 2070 via bus 2001. Components of direct software repository 2040 carry out various scanning and/or updating operations on dormant disk 2080 via this coupling to file system interface 2070. A list of software detected on dormant disk 2080 by software detector 2025 is maintained in configuration database 2015. Controller 2005 couples this list of detected software to direct software repository 2040 for scanning.

In one embodiment, software repository 2040 comprises a direct scanner-updater 5005 that consolidates functions of scanning and updating into one piece of software. In other embodiments, the scanning and updating functions are performed by distinct, separable software components such as direct scanner 5010 and direct updater 5020. In an embodiment utilizing distinct components, direct scanner-updater 5005 may comprise only direct scanner 5010, only direct updater 5020, or both. In an embodiment utilizing both, scan output 5015 represents an output of direct scanner 5015 that is coupled as an input to direct updater 5020. In one embodiment, scan output 5015 is also coupled to controller 2005 via bus 2001.

Scanner-updater 5005, direct scanner 5010, and direct updater 5020 in direct software repository 2040 are specifically designed to work directly with a dormant disk, such as dormant disk 2080 (FIG. 2) without requiring the dormant disk to be booted. Scanner-updater 5005, direct scanner 5010, and direct updater 5020 are all parameterized. This means that each piece of software in software repository 2040 determines what type of disk it is operating with, such as a dormant disk or a particular type of dormant disk. After the type of disk is determined, software within direct software repository 2040 interacts with the particular disk type in a manner that is supported by the particular disk type.

In 4010 of FIG. 4, embodiments in accordance with the present perform scanning of files on dormant disk 2080 in a specialized manner when utilizing a direct scanning approach. When scanning an active disk, a normal scanner performs scanning operations by issuing any type of system call needed, such as general purpose system calls or file system system calls. However, many general purpose system calls cannot be answered by dormant disk 2080, and thus a direct scanner only makes file system system calls that can easily be redirected to dormant disk 2080. To execute this restricted set of system calls, direct scanner 5010 couples to file system interface 2070, which is exposed by the volume mounting process. Direct scanner 5010 then directly scans the appropriate exposed file(s) on dormant disk 2080 to retrieve the information needed. For instance, to find the version number of a piece of software on an active disk, a normal scanner would simply make a system call, such as API call "GetVersion" to the operating system running on the active disk. However, when interacting with dormant disk 2080 this method of scanning would require booting the dormant disk. In embodiments of the present invention, instead of booting dormant disk 2080 to find a version number of a piece of software, direct scanner 5010 utilizes file system interface 2070 to look up the registry file on dormant disk 2080. Direct scanner 5010 will then issue a command to controller 2005 to mount the registry file. Direct scanner 5010 will then determine the version number of a piece of software on dormant disk 2080 by scanning the mounted registry file. This specialized nature of interaction with dormant disk 2080 allows direct scanner 5010 to achieve scanning software residing on dormant disk 2080 without requiring booting of dormant disk 2080. In other words, the exposed software files on dormant disk 2080 are scanned via the direct approach while dormant disk 2080 remains in a dormant state.

In 4015 of FIG. 4, embodiments in accordance with the present invention determine whether an update is available for the software residing on dormant disk 2080. In the direct approach, this determining is done by direct scanner 5010 by comparing the status of scanned files with known vulnerabilities. Known vulnerabilities are typically cached in a vulnerabilities database such as vulnerabilities database 2045 (FIG. 5). In other embodiments, vulnerabilities database 2045 can also comprise a pointer to a cached database of vulnerabilities. Direct scanner 5010 (FIG. 5) determines whether updates such as patches, new versions, new software, etc. are needed for any scanned dormant disk. Direct scanner 5010 determines what updates are needed by referencing vulnerabilities database 2045 and information provided from policies stored in configuration database 2015.

If an update is determined to be needed, direct scanner 5010 the lists the determined update in scan output 5015. Scan output 5015 also identifies software and disks needing updates. Scan output 5015 is coupled to direct updater 5020 (FIG. 5) and to controller 2005 (FIG. 2).

In 4020 of FIG. 4, embodiments in accordance with the present invention apply an update to the software residing on dormant disk 2080. In some embodiments, this update is applied to dormant disk 2080 while dormant disk 2080 remains in a dormant state. In one embodiment the update is applied automatically, after the scanning. In another embodiment the update is performed at a scheduled time, in response to an update schedule or policy maintained in configuration database 2015 (FIG. 2). In one embodiment using the direct approach, this update is applied to dormant disk 2080 by utilizing direct updater 5020 (FIG. 5). Direct updater 5020 is coupled to file system interface 2070, and is configured to interact directly with dormant disk 2080 in a similar specialized manner as previously described with direct scanner 5010 (FIG. 5).

Direct updater 5020 couples to patch/installer repository 2065 (FIG. 5). As represented in FIG. 2, patch repository 2065 is a global repository that is also accessible by other files. In addition to patches and updates, patch/installer repository 2065 may contain full installers capable of installing a complete software product. The structure of a patch/installer repository, such as patch/installer repository 2065 is known in the art. Direct updater 5020 retrieves update files as needed (per scan output 5015) from patch/installer repository 2065.

In one embodiment of 4020 of FIG. 4, an update is applied to software residing on dormant disk 2080 by utilizing a direct updating approach to install an update file on dormant disk 2080. The update file is installed without requiring booting of dormant disk 2080. The update file comprises information needed to perform an update that was identified through the process of scanning dormant disk 2080. In this direct updating approach, direct updater 5020 couples directly with file system interface 2070. Software to be updated on dormant disk 2080 is accessed and, under direction from controller 2005, update files are installed on dormant disk 2080 without requiring booting of dormant disk 2080.

In 4025 of FIG. 4, embodiments in accordance with the present invention generate a notification to indicate that dormant disk 2080 is in need of an update. In one embodiment, controller 2005 utilizes information from scan output 5015 to generate a notification to indicate that dormant disk 2080 is in need of an update. In one embodiment, such a notification is generated when a dormant disk needs updates, but the updates cannot be safely or reliably applied while the disk is in a dormant state. The notification contains enough information to allow a consumer (human user or software program) to identify the dormant disk that needs updating. This notification can be displayed for user viewing, for instance, in control interface 3006 (FIG. 3). This notification can also be stored in configuration database 2015 (FIG. 2), supplied as an input to another software program, or stored on dormant disk 2080 for future reference. The notification can be generated using a known technique such as a network packet, a callback procedure, a function return code, or an asynchronous message.

Direct Approach—Self-Update Method

In another embodiment of 4020 of FIG. 4, referred to as a self-update method, direct updater 5020 stores an update file on dormant disk 2080. The update file is then installed on dormant disk 2080 at some later time, when dormant disk 2080 is next booted. The self-update method requires very little intrusion onto dormant disk 2080. The self-update method also minimizes exposure of dormant disk 2080 to vulnerability upon booting, because updates begin installing immediately without requiring a connection to the internet. The update file comprises information needed to install an identified update to software residing on dormant disk 2080. The update file is stored on dormant disk 2080 with direction from controller 2005, and the storing is done without requiring booting of dormant disk 2080. In other words, the update file is stored on dormant disk 2080 while dormant disk 2080 remains in a dormant state. Controller 2005 also directs script creator 2020 to create a self executing control script (as previously described). The script is also stored on dormant disk 2080 with direction from controller 2005. The script is also stored on dormant disk 2080 while dormant disk 2080 remains in a dormant state. The script automatically runs the next time dormant disk 2080 is booted. When the script runs, it executes instructions that cause the update file to be installed on dormant disk 2080. In some embodiments, the stored update file is self-executing. In other embodiments, the script utilizes information in the stored update file to perform the required update.

In one embodiment of 4020 of FIG. 4, after the update file and script are installed, controller 2005 can issue a command to boot dormant disk 2008 so that the update file will be installed. The booting command is issued, for instance, in accordance with a policy maintained in configuration database 2015 (FIG. 2). In one embodiment, controller 2005 issues the boot command immediately after the update file and script are stored on dormant disk 2005. In another embodiment, controller 2005 issues the boot command at a scheduled time, for instance in the middle of the night, when more computer resources may be available to perform the booting. In yet another embodiment, controller 2005 causes the booting of dormant disk 2080 to be performed in an isolated environment that is not coupled to an internet connection. Script creator 2020 can do this, for instance, by inserting information into the script to disable network interface cards prior to the update, with additional information to re-enable network interface cards after the update is complete. After the update is installed controller 2005 returns dormant disk 2080 to a dormant state.

Thus, in accordance with the above descriptions, embodiments of the present invention utilize a direct approach to scan and/or update software on a dormant disk. Embodiments utilizing the direct approach perform scanning and/or updating of software on a dormant disk, without requiring booting of the dormant disk.

Indirect Approach

Indirect Approach—Immediate Scan and Update Methods

Referring again to 4005 of FIG. 4, embodiments in accordance with the present invention access exposed files, the files being exposed by mounting of a dormant disk, such as disk 2080. This accessing has been previously described, and is performed in the same manner in the indirect approach, with an exception being that when system 2000 (FIG. 2) is configured for utilizing an indirect approach, virtual environment 2050 is also capable of accessing exposed files on dormant disk 2080. In many embodiments, scanning and/or updating of dormant disk 2080 is performed immediately upon direction by controller 2005 through the use of the indirect approach described below.

With reference to 4010 of FIG. 4, embodiments in accordance with the present invention scan the exposed files to determine the status of software residing on dormant disk 2080. In the indirect approach, the scanning is achieved without requiring booting of dormant disk 2080. In other words, the exposed files are scanned via the indirect approach while dormant disk 2080 remains in a dormant state. In one embodiment of 4010 of FIG. 4, utilizing an indirect scanning approach, this scanning is performed by employing virtual environment 2050 in conjunction with legacy software, such as legacy scanner 7010 (FIG. 7) of legacy software repository 2055 (FIGS. 2 and 7) to achieve scanning of software on dormant disk 2080.

Figure 6:
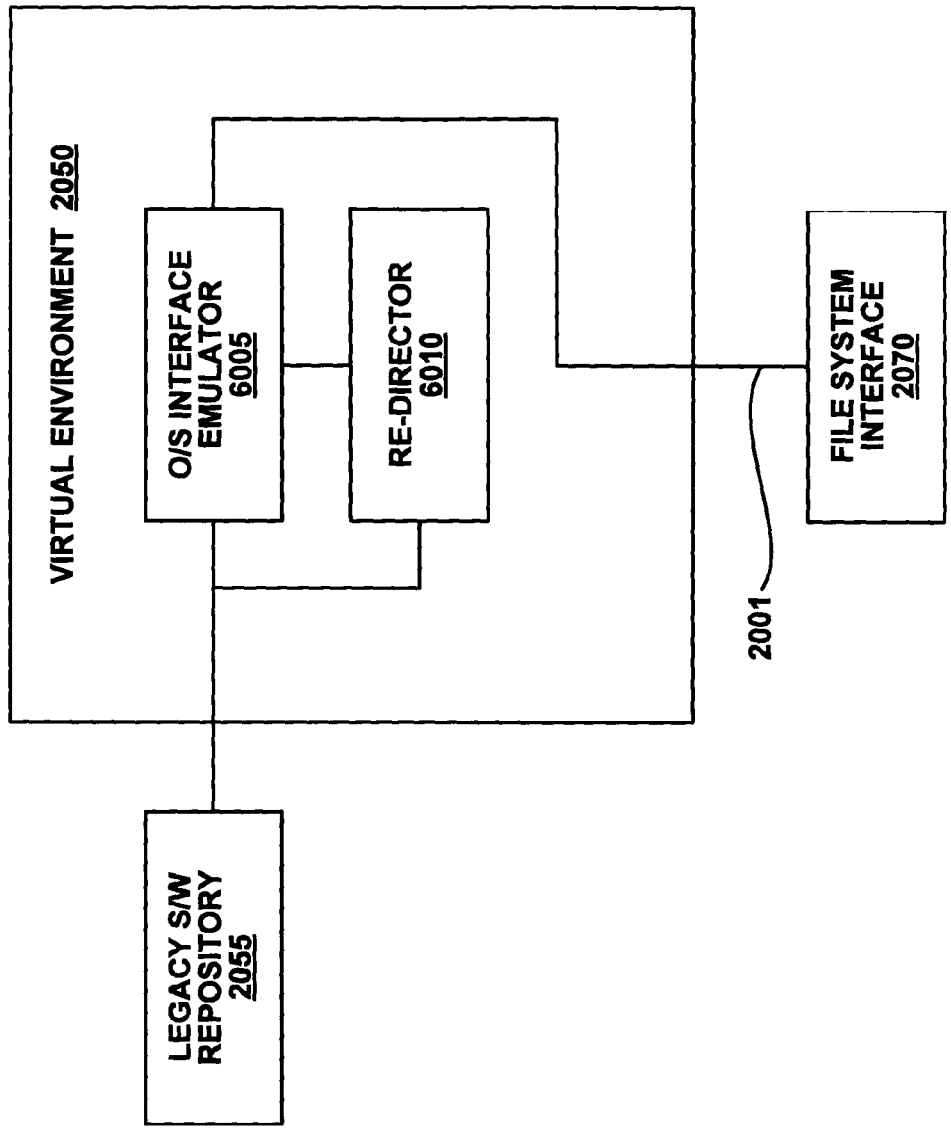
FIG. 6 is a block diagram of an exemplary virtual environment used in a system for updating software on dormant disks, according to one embodiment of the present invention.

In 4010, when utilizing the indirect approach, virtual environment 2050 plays a central role. FIG. 6 shows a block diagram of an exemplary virtual environment 2050 used in a system 2000 for updating software on dormant disks, according to one embodiment of the present invention. Virtual environment 2050 is configured to couple between to file system interface 2070 and legacy software repository 2055. Virtual environment 2050 configured to coordinate and emulate communications between said file system interface 2070 and legacy software repository 2055. Virtual environment 2050 is also configured to interact with components of legacy software repository 2055 to achieve scanning and/or updating operations on dormant disk 2080.

Figure 7:
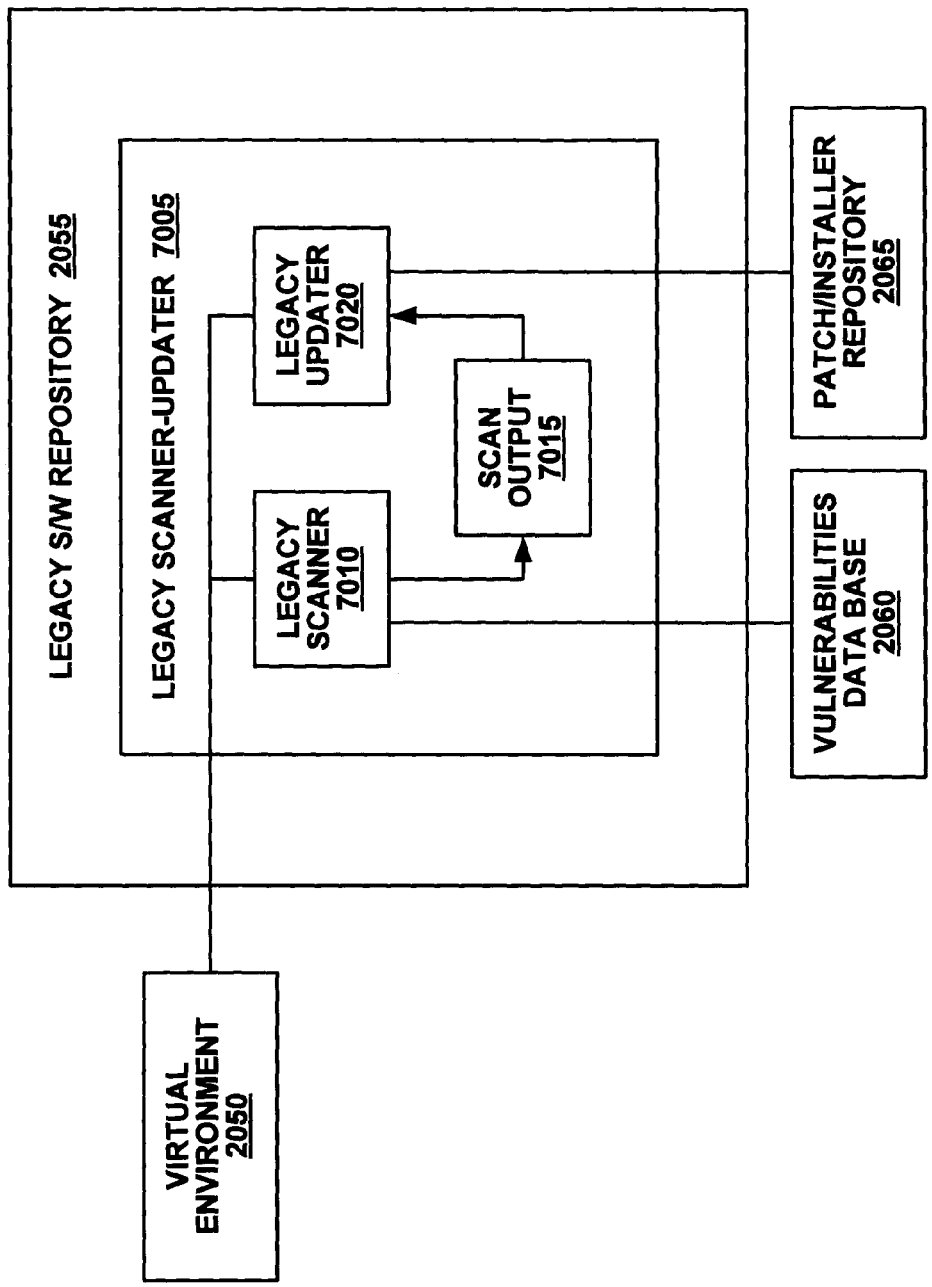
FIG. 7 is a block diagram of an exemplary legacy software repository used with a system for updating software on dormant disks, according to one embodiment of the present invention.

In 4015 of FIG. 4, embodiments according to the present invention determine whether an update is available for the software residing on dormant disk 2080. In one embodiment utilizing the indirect approach, this determining is done by legacy scanner 7010 (FIG. 7), which operates through virtual environment 2050 to compare the status of scanned files with known vulnerabilities. Virtual environment 2050 then intercepts, redirects, and emulates actions and responses to system calls from legacy scanner 7010. Known vulnerabilities are typically cached in a vulnerabilities database such as vulnerabilities database 2060 (FIG. 7). In other embodiments, vulnerabilities database 2060 can also comprise a pointer to a cached database of vulnerabilities. Legacy scanner 7010 (FIG. 7) determines whether updates such as patches, new versions, new software, etc. are needed for any scanned dormant disk. Legacy scanner 7010 determines what updates are needed by referencing vulnerabilities database 2045 and, in some embodiments, information provided from policies stored in configuration database 2015.

In one embodiment, if an update is determined to be needed, legacy scanner 7010 the lists the determined update in scan output 7015 (FIG. 7). Scan output 7015 also identifies software and disks needing updates. Scan output 7015 is coupled to legacy updater 7020 (FIG. 7). In some embodiments controller 2005 (FIG. 2) is also configured to couple to legacy updater 7020 and/or legacy scanner 7010 through virtual environment 2050.

In 4020 of FIG. 4, embodiments in accordance with the present invention apply an update to the software residing on dormant disk 2080. In some embodiments, this update is applied to dormant disk 2080 while dormant disk 2080 remains in a dormant state. In one embodiment the update is applied automatically, after the scanning. In another embodiment the updating is performed at a scheduled time, in response to an update schedule or policy maintained in configuration database 2015 (FIG. 2).

In one embodiment of 4020 of FIG. 4, utilizing the indirect approach, this update is applied to dormant disk 2080 by utilizing legacy updater 7020 running through virtual environment 2050. Legacy updater 7020 interacts with virtual environment 2050, as described above, to achieve file operations on dormant disk 2080. Legacy updater 7020 couples to patch/installer repository 2065 (FIG. 7). As represented in FIG. 2, patch repository 2065 is a global repository that is also accessible by other files. In addition to patches and updates, patch/installer repository 2065 may contain full installers capable of installing a complete software product. The structure of a patch/installer repository, such as patch/installer repository 2065 is known in the art. Legacy updater 7020 retrieves update files as needed (per scan output 7015) from patch/installer repository 2065.

According to one embodiment of 4020 of FIG. 4, an update is applied to software residing on dormant disk 2080 by utilizing an indirect updating approach to install an update file on dormant disk 2080. The update file is installed without requiring booting of dormant disk 2080. In this indirect updating approach, virtual environment 2050 is employed to achieve installation of the update file. Legacy updater 7020 is coupled with virtual environment 2050. Virtual environment 2050 then intercepts, redirects, and emulates actions and responses to system calls from legacy updater 7020.

Consider an example where several old files on dormant disk 2080 need to be overwritten with new files. Virtual environment 2050 collects all the new files sent from legacy updater 7020 and temporarily stores them. Virtual environment 2050 emulates an appropriate response to legacy updater 7020 to indicate that the update files have been properly installed on dormant disk 2080. Virtual environment 2050 then translates the files into a format that will allow them to be applied to dormant disk 2080. Depending upon the situation, applying the updates to disk 2080 can comprise either storing or installing the translated update files on dormant disk 2080. Thus, through virtual environment 2050, software to be updated on dormant disk 2080 is accessed and update files are installed on dormant disk 2080 without requiring booting of dormant disk 2080.

In 4025 of FIG. 4, embodiments in accordance with the present invention generate a notification to indicate that dormant disk 2080 is in need of an update. In one embodiment, controller 2005 utilizes information from scan output 7015 to generate a notification to indicate dormant disk 2080 is in need of an update. In one embodiment, such a notification is generated when a dormant disk needs updates, but the updates cannot be safely or reliably applied while the disk is in a dormant state. The notification contains enough information to allow a consumer (human user or software program) to identify the disk that needs updating. This notification can be displayed for user viewing, for instance, in control interface 3006 (FIG. 3). This notification can also be stored in configuration database 2015 (FIG. 2), supplied as an input to another software program, or stored on dormant disk 2080 for future reference. The notification can be generated using a known technique such as a network packet, a callback procedure, a function return code, or an asynchronous message.

Indirect Approach—Self-Update Method

According to another embodiment of 4020 of FIG. 4, referred to as a self-update method, virtual environment 2050 receives an update file from legacy updater 7020. The update file comprises information needed to install an identified update to software residing on dormant disk 2080. Virtual environment 2050 is employed to carry out operations, with direction from controller 2005 (FIG. 2), to translate (if necessary) and store the update file on dormant disk 2080. The storing is done without requiring booting of dormant disk 2080. In other words, this update file is stored on dormant disk 2080 while dormant disk 2080 remains in a dormant state. Controller 2005 also directs script creator 2020 to create a self-executing control script (as previously described). The script is also stored on dormant disk 2080 with direction from controller 2005. The script is also stored on dormant disk 2080 while dormant disk 2080 remains in a dormant state. The script automatically runs the next time dormant disk 2080 is booted. When the script runs, it executes instructions that cause the update file to be installed on dormant disk 2080. In some embodiments, the stored update file is self-executing. In other embodiments, the script utilizes information in the stored update file to perform the required update. Thus, the update file is then installed on dormant disk 2080 at some later time, when dormant disk 2080 is next booted. The self-update method requires very little intrusion onto dormant disk 2080. The self-update method also minimizes exposure of dormant disk 2080 to vulnerability upon booting, because updates begin installing immediately without requiring a connection to the internet.

In one self-update embodiment of 4020 of FIG. 4, after the update file and script are installed, controller 2005 can issue a command to boot dormant disk 2008 so that the update file will be installed. The booting command is issued, for instance, in accordance with a policy maintained in configuration database 2015 (FIG. 2). In one embodiment, controller 2005 issues the boot command immediately after the update file and script are stored on dormant disk 2005. In one embodiment, controller 2005 issues the boot command at a scheduled time, for instance in the middle of the night, when more computer resources may be available to perform the booting. In yet another embodiment, controller 2005 causes the booting of dormant disk 2080 to be performed in an isolated environment that is not coupled to an internet connection. Script creator 2020 can do this, for instance, by inserting information into the script to disable network interface cards prior to the update, with additional information to re-enable network interface cards after the update is complete. After the update is installed controller 2005 returns dormant disk 2080 to a dormant state.

Indirect Approach—Operation of an Exemplary Virtual Environment in a System for Updating Software on Dormant Disks Virtual environment 2050 is central to the indirect approach for scanning and updating software on a dormant disk. A detailed discussion of the operation of virtual environment 2050 within system 2000 is therefore warranted.

Virtual environment 2050 is a program or code module that virtualizes the local or remote operating software interface that is expected by a legacy scanner, legacy updater, or combined legacy scanner/updater. As shown in FIG. 6, virtual environment 2050 is comprised of an operating system interface emulator 6005 and a re-director 6010, which are coupled to one another. Operating system interface emulator 6005 and re-director 6010 are coupled to legacy software repository 2055. Operating system interface emulator 6005 is also coupled to file system interface 2070 via bus 2001. Virtual environment 2050 allows system 2000 to trick legacy scanning and/or legacy updating software into "thinking" that it is communicating with an operating system booted from dormant disk 2080. In reality, the legacy scanning and/or legacy updating software runs on operating system interface emulator 6005, which in turn runs on server operating system 2075 (FIG. 2).

Virtual environment 2050 accomplishes this task by creating an operating system interface 6005 that emulates or mimics the local or remote operating system interfaces that legacy software repository 2055 expects of an active operating system. System calls requiring interaction with virtual disk 2080 are then redirected to operating system interface emulator 6005.

System call re-director 6010 is configured for redirecting system calls from legacy software repository 2055. System call re-director 6010 is used to handle mapping of system calls that should be redirected to operating system interface emulator 6005, and those that should simply be passed through to server operating system 2075. A common way for a piece of software to send system calls to an operating system is to route all system calls through a table or library of pointers. Each pointer points to functions or application program interfaces that will handle a system call. In one embodiment, re-director 6010 patches this library in any scanning or updating software that resides in legacy software repository 2055. The patching causes all system calls requiring interaction with dormant disk 2075 to be redirected to operating system interface emulator 6005 for fulfillment. In another embodiment, re-director 6010 accomplishes the same result by dynamically substituting a different library of pointers for the library normally utilized by a piece of software in legacy software repository 2055.

Operating system interface emulator 6005 is configured for interacting with legacy software repository 2055. Operating system interface emulator 6005 is further configured to emulate responses to system calls and interact with dormant disk 2080. Operating system interface emulator 6005 receives redirected system calls from legacy software repository 2055, carries out actions to fulfill them, and emulates any expected responses to legacy software repository 2055.

Operating system interface emulator 6005 only emulates the subset of the operating system interface that a legacy tool expects to interact with. Specifically, operating system interface emulator 6005 emulates only the system procedures invoked by system calls from legacy software repository 2055 to perform scans, updates, or other actions on dormant disk 2080. This subset of system procedures can be determined by monitoring the actions of legacy scanning and updating tools as they operate in a real operating system environment on an active computer and an active disk.

Most system calls intercepted by operating system interface emulator 6005 are translated into data queries or data modifications to files or portions of files on dormant disk 2080. These queries and modifications are then sent to file system interface 2070 or server operating system 2075 to be carried out as file operations on the mounted volumes of dormant disk 2080. Specific examples illustrated below, help explain how virtual environment 2050 handles file access requests, configuration management requests, state change operations, and other system calls received from tools in legacy software repository 2055.

FIG. 7 is a block diagram of an exemplary legacy software repository 2055 used with a system 2000 for updating software on dormant disks, according to one embodiment of the present invention. Legacy software repository 2055 is coupled to virtual environment 2050, to vulnerabilities database 2060, and to patch installer repository 2065. Components of legacy software repository 2055 are normally used to engage with software and files on an active disk. However, when coupled to system 2000, components of legacy software repository 2055 are enabled to interact with software and files on dormant disks. In one embodiment, legacy software repository 2055 comprises a legacy scanner-updater 7005 that consolidates functions of scanning and updating into one piece of software. In other embodiments, the scanning and updating functions are performed by distinct, separable software components such as legacy scanner 7010 and legacy updater 7020. In an embodiment utilizing distinct components, legacy scanner-updater 7005 may comprise only legacy scanner 7010, only legacy updater 7020, or both. In an embodiment utilizing both, scan output 7015 represents an output of legacy scanner 7010 that is coupled as an input to legacy updater 7020. In one embodiment, information from scan output 7015 is also coupled to controller 2005 via virtual environment 2050.

For file access, legacy scanners and updaters typically use file-related system calls to read and write files of the computer or disk being scanned or updated. The system call typically identifies the file to be accessed by a file name and a path. In system 2000, the volumes of dormant disk 2080 are mounted in the file name space of server operating system 2075. This allows operating system interface emulator 6005 to emulate those legacy system calls from legacy software repository 2055 by performing a simple path translation and then forwarding the system call to the server operating system 2075, with the translated path.

For example, consider what happens when legacy scanner-updater 7005 wishes to call a hypothetical OpenFile procedure on a file with path "/etc/hosts" within a volume of dormant disk 2080 that contains a Unix-family operating system. This path identifies the file hosts in the directory "/etc". This path would be correct if legacy scanner 7010 were communicating with an active operating system booted from dormant disk 2080. However, since disk 2080 is dormant, its operating system is also dormant, and therefore not active. For purposes of this example, suppose disk mount manager 2030 has mounted the volume of dormant disk 2080 onto mount point "/dormant/100/" in the file name space of server operating system 2075. When operating system interface emulator 6005 of virtual environment 2050 receives the OpenFile ("/etc/hosts") request, it translates it to OpenFile ("/dormant/100/etc/hosts"). Operating system interface emulator 6005 then forwards the translated request to the server operating system 2075 through its file system interface 2070. The net effect of this interposition of virtual environment 2050 is that legacy scanner 7005 is indirectly allowed to open the file it actually desires. Without the path translation, the forwarded OpenFile ("/etc/hosts") system call would cause legacy scanner-updater 7005 to open a non-existent file, or worse, the "/etc/hosts" file of server operating system 2075.

A legacy scanner 7010 or legacy updater 7020 often calls procedures for obtaining configuration information about an operating system and installed applications. For instance, in the Windows family of operating systems, a legacy scanner 7010 can call "GetVersion( )" to obtain the major and minor version numbers of the operating system. Under normal circumstances, with an active disk, the operating system has its own version numbers cached in memory and simply returns them to the calling program. However, when system 2000 runs legacy scanner 7010 in virtual environment 2050 to scan dormant disk 2080, the primary operating system of the dormant disk 2080 does not exist anywhere in memory.

Fortunately, a computer's operating system is usually loaded from files on the disk. Therefore, configuration information about the primary operating system of dormant disk 2080 can typically be obtained from program and configuration files residing in the system folder that is located by the software detector 2025 (FIG. 2) after dormant disk 2080 is mounted. In the example above, the system call from legacy scanner 7010 is redirected to operating system interface emulator 6005 (FIG. 6). Operating system interface emulator 6005 obtains the version numbers of the operating system by reading specific entries in the Windows registry database that is stored in a set of files in the system folder of dormant disk 2080. Operating system interface emulator 6005 then supplies this version information, in an expected format, to legacy scanner 7010 to fulfill the system call request.

In another example, legacy updater 7020 can make system calls intended to change the run-time state of the operating system running a disk. For example, legacy updater 7020 can request a reboot of dormant disk 2080. If the operation involves changing the run-time state or memory state of an operating system, virtual environment 2050 can usually ignore the operation since dormant disk 2080 is not booted. Virtual environment 2050 simply emulates an expected response to the state change system call, but makes no state changing operations with regard to dormant disk 2080. The emulated response typically comprises returning an appropriate status code to legacy updater 7020 to indicate a successful result to the system call, even though no run-time state operation has been performed on dormant disk 2080.

As previously indicated, certain system calls made by a software tool in legacy software repository 2055 can be forwarded to server operating system 2075 without any translation. For example, a legacy updater 7020 interacting with a Windows-family operating system can call "GetSystemTime" to query the current date. A system call such as this can be safely forwarded, without translation, through virtual environment 2050, and on to server operating system 2075. This is because the concept of current time is universal and is therefore independent of the operating system reporting it. Likewise, other similar system calls can generally be safely forwarded without translation.

Thus, in accordance with the above descriptions, embodiments of the present invention utilize an indirect approach to scan and/or update software on a dormant disk. Embodiments utilizing the indirect approach perform scanning and/or updating of software on a dormant disk, without requiring booting of the dormant disk.

Combinations of Approaches

For purposes of simplicity, the components and methods utilized in the direct approach and indirect approach have been described separately. However, it is appreciated that numerous combinations of the separately described direct and indirect approaches are anticipated. For instance, one embodiment of the present invention utilizes a direct scanning approach. An indirect updating approach is then utilized to store an update file on a dormant disk. A self executing script is also stored on the disk. The dormant disk then performs a self-update immediately after it is next booted. Thus, such an embodiment exemplifies a combination of direct scanning, indirect updating, and a self-executing script. It should be understood that various other combination of approaches in accordance with the present invention can be utilized.

It should be additionally noted, that all components necessary for implementing either the direct or indirect approaches are shown in (or coupled to) system 2000 of FIG. 2. It is appreciated however, that in an embodiment of system 2000 employing only a subset of these possible approaches for scanning and/or updating, only the components necessary for the particular approach or approaches need be included in system 2000. For instance, in an embodiment of system 2000 that employs a direct approach for scanning and updating software on a dormant disk, virtual environment 2050 and couplings to legacy software repository 2055 and vulnerabilities database 2060 are not required. Likewise, in an embodiment of system 2000 that employs an indirect approach for scanning and updating software on a dormant disk, direct software repository 2040 and vulnerabilities database 2045 are not necessary. Similarly, an embodiment that does not utilize a self-update approach will not require inclusion of script creator 2020.

Example Computer System Environment

Figure 8:
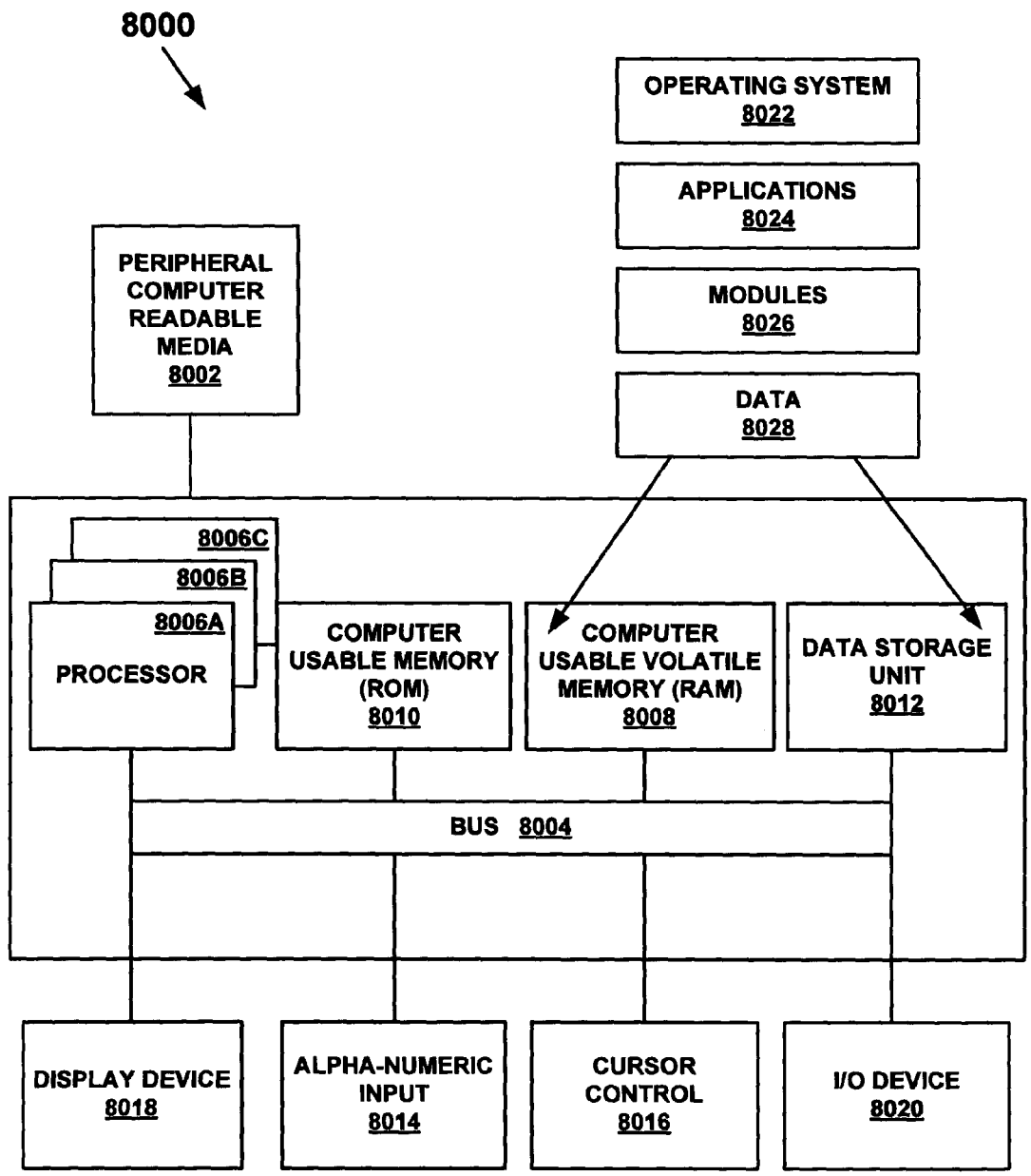
FIG. 8 is a diagram of an exemplary computer system upon which embodiments of the present technology for updating software on dormant disks may be practiced.

With reference now to FIG. 8, portions of the present invention are composed of computer-readable and computer-executable instructions that reside, for example, in computer-usable media of a computer system. That is, FIG. 8 illustrates one example of a type of a computer that can be used to implement embodiments of the present invention, which are discussed below. FIG. 8 illustrates an exemplary computer system 8000 that can be implemented from physical components, virtual components, or some combination thereof. It is appreciated that system 8000 of FIG. 8 is exemplary only and that the present invention can operate on or within a number of different computer systems including general purpose networked computer systems, embedded computer systems, routers, switches, server devices, client devices, various intermediate devices/nodes, stand alone computer systems, physical computer systems, virtual computer systems, and the like.

Computer system 8000 of FIG. 8 is well adapted to having peripheral computer readable media 8002 such as, for example, a floppy disk, a compact disc, a virtual disk and the like coupled thereto. System 8000 of FIG. 8 includes an address/data bus 8004 for communicating information, and a processor 8006A coupled to bus 8004 for processing information and instructions. As depicted in FIG. 8, system 8000 is also well suited to a multi-processor environment in which a plurality of processors 8006A, 8006B, and 8006C are present. Conversely, system 8000 is also well suited to having a single processor such as, for example, processor 8006A. Processors 8006A, 8006B, and 8006C may be any of various types of microprocessors.

System 8000 also includes data storage features such as a computer usable volatile memory 8008, e.g. random access memory (RAM), coupled to bus 8004 for storing information and instructions for processors 8006A, 8006B, and 8006C. System 8000 also includes computer usable non-volatile memory 8010, e.g. read only memory (ROM), coupled to bus 8004 for storing static information and instructions for processors 8006A, 8006B, and 8006C. Also present in system 8000 is a data storage unit 8012 (e.g., a magnetic, optical disk, etc.) coupled to bus 8004 for storing information and instructions. System 8000 also includes an optional alphanumeric input device 8014 including alphanumeric and function keys coupled to bus 8004 for communicating information and command selections to processor 8006A or processors 8006A, 8006B, and 8006C. System 8000 also includes an optional cursor control device 8016 coupled to bus 8004 for communicating user input information and command selections to processor 8006A or processors 8006A, 8006B, and 8006C. System 8000 of the present embodiment also includes an optional display device 8018 coupled to bus 8004 for displaying information.

Referring still to FIG. 8, optional display device 8018 may be a liquid crystal device, cathode ray tube, plasma display device or other display device suitable for creating graphic images and alphanumeric characters recognizable to a user. Optional cursor control device 8016 allows the computer user to dynamically signal the movement of a visible symbol (cursor) on a display screen of display device 8018. Many implementations of cursor control device 8016 are known in the art including a trackball, mouse, touch pad, joystick or special keys on alpha-numeric input device 8014 capable of signaling movement of a given direction or manner of displacement. Alternatively, it will be appreciated that a cursor can be directed and/or activated via input from alpha-numeric input device 8014 using special keys and key sequence commands. System 8000 is also well suited to having a cursor directed by other means such as, for example, voice commands. System 8000 also includes an I/O device 8020 for coupling system 8000 with external entities. For example, in one embodiment, I/O device 8020 is a modem for enabling wired or wireless communications between system 8000 and an external network such as, but not limited to, the Internet. A more detailed discussion of the present technology for identifying design issues in electronic forms is found below.

In FIG. 8, various other components are depicted for system 8000. Specifically, when present, an operating system 8022, applications 8024, modules 8026, and data 8028 are shown as typically residing in one or some combination of computer usable volatile memory 8008, e.g. random access memory (RAM) and data storage unit 8012. In one embodiment, the present technology for identifying design issues in electronic forms, for example, is stored as an application 8024 or module 8026 in memory locations within RAM 8008 and memory areas within data storage unit 8012.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for scanning and updating software on a dormant disk, said system comprising:
    a first software repository configured to couple to file system interface, wherein components of said first software repository are configured to engage directly with said file system interface to perform scanning and updating operations on said dormant disk;
    a virtual environment configured to couple between said file system interface and a second software repository, wherein said virtual environment is further configured to interact with components of said second software repository to achieve scanning and updating operations on said dormant disk, the virtual environment is a code module that virtualizes a local or remote operating software interface that is expected by a legacy scanner or legacy updater or combined legacy scanner/updater, the virtualizing of the local or remote operating software interface is creating software abstractions of the local or remote operating software interface; and
    wherein, the dormant disk is a storage disk having software that is capable of booting a computer system and is attached to a computer system which is not booted from the dormant disk and the updating operations are performed on the dormant disk without requiring booting of the dormant disk; a vulnerabilities database configured to couple to said first software repository, wherein said vulnerabilities database comprises a cache of known vulnerabilities for software products scanned by said components of said first software repository.

2. The system of claim 1, wherein said virtual environment comprises a redirector configured for redirecting system calls from said second software repository.

3. The system of claim 1, wherein said virtual environment comprises an operating system interface emulator configured for interacting with said second software repository, said operating system interface emulator further configured for emulating responses to said system calls and interfacing with said dormant disk.

4. The system of claim 1, further comprising a controller configured to couple to said file system interface, said controller for coordinating system actions performed on said dormant disk.

5. The system of claim 4, wherein said controller comprises a scheduler for scheduling tasks related to scanning and updating said software residing on said dormant disk.

6. The system of claim 4, wherein said controller comprises a control interface, said control interface providing set up and management interfaces for interacting with said system for updating software on said dormant disk.

7. The system of claim 4, wherein said controller comprises a discoverer, said discoverer configured for interfacing with existing infrastructure management components and for scanning a computing environment to enumerate devices coupled to said controller within said computing environment.

8. The system of claim 4, further comprising a disk mount manager, said disk mount manager for mounting and unmounting said dormant disk.

9. The system of claim 4, further comprising a configuration database configured to couple to said controller, said configuration database for storing and providing access to schedule information and configuration information.

10. The system of claim 4, further comprising a software detector configured to couple to said controller, said software detector for detecting software configurations on said dormant disk.

11. The system of claim 4, further comprising a script creator configured to couple to said controller, said script creator for creating an executable script for storing on said dormant disk.

12. A method of updating software on a dormant disk, said method comprising:
    accessing exposed files by a software detector, said exposed files being exposed by mounting of said dormant disk;
    scanning, by a software repository, said exposed files with a direct scanning approach to determine the status of software residing on said dormant disk, wherein said direct scanning approach couples directly to a file system interface associated with said dormant disk, and wherein said dormant disk remains dormant said scanning:

determining whether an update is available for said software residing on said dormant disk;

applying an update to said software residing on said dormant disk utilizing an indirect updating approach, wherein said indirect updating approach employs a virtual environment to achieve application of said update, the virtual environment is a code module that virtualizes a local or remote operating software interface that is expected by a legacy scanner, legacy updater, or combined legacy scanner/updater, the virtualizing of the local or remote operating software interface is creating software abstractions of the local or remote operating software interface; and wherein, the dormant disk is a storage disk having software that is capable of booting a computer system and is attached to a computer system which is not booted from the dormant disk and the updating operations are performed on the dormant disk without requiring booting of the dormant disk; a vulnerabilities database configured to couple to said first software repository, wherein said vulnerabilities database comprises a cache of known vulnerabilities for software products scanned by said components of said first software repository.

13. The method of claim 12, wherein said applying an update to said software residing on said dormant disk utilizing an indirect updating approach comprises installing an update on said dormant disk with said indirect updating approach, wherein said dormant disk remains in a dormant state while said indirect updating approach achieves said installation of said update file.

14. The method of claim 12, wherein said applying said update to said software residing on said dormant disk using an indirect updating approach comprises:

storing an update file on said dormant disk with said indirect updating approach while said dormant disk remains in said dormant state, said update file comprising information to install said update to said software residing on said dormant disk; and storing a script on said dormant disk with said indirect updating approach while said dormant disk remains in said dormant state, wherein said script is configured to cause said update file to be installed upon booting of said dormant disk.

15. The method of claim 14, further comprising booting said dormant disk at a scheduled time, wherein said booting causes said script to install said update file.

16. A method of updating software on a dormant disk, said method comprising:

accessing exposed files, said exposed files being exposed by mounting of said dormant disk;

scanning, by a software repository, said exposed files with an indirect scanning approach to determine the status of software residing on said dormant disk, wherein said indirect scanning approach employs a virtual environment to achieve said scanning of said dormant disk, and wherein said dormant disk remains dormant during said scanning, the virtual environment is a code module that virtualizes a local or remote operating software interface that is expected by a legacy scanner, legacy updater, or combined legacy scanner/updater, wherein the virtualizing of the local or remote operating software interface is creating software abstractions of the local or remote operating software interface;

determining whether an update is available for said software residing on said dormant disk; and applying an update to said software residing on said dormant disk utilizing a direct updating approach, wherein said direct updating approach couples directly to a file system interface associated with said dormant disk to achieve application of said update, wherein the applying of the update is performed on the dormant disk without requiring booting of the dormant disk; a vulnerabilities database configured to couple to said first software repository, wherein said vulnerabilities database comprises a cache of known vulnerabilities for software products scanned by said components of said first software repository.

17. The method of claim 16, wherein said applying of the update comprises installing an update file on said dormant disk with said direct updating approach, wherein said dormant remains in a dormant state while said direct updating approach achieves said installation of said update file.

18. The method of claim 16, wherein said applying said update to said software residing on said dormant disk using a direct updating approach comprises:

storing an update file on said dormant disk with said direct updating approach while said dormant disk remains in said dormant state, said update file comprising information to install said update to said software residing on said dormant disk; and storing a script on said dormant disk with said direct updating approach while said dormant disk remains in said dormant state, wherein said script is configured to cause said update file to be installed upon booting of said dormant disk.

19. The method of claim 16, further comprising booting said dormant disk at a scheduled time, wherein said booting causes said self-executing script to install said update file.

* * * * *